US009325464B2

(12) United States Patent
Gao et al.

(10) Patent No.: US 9,325,464 B2
(45) Date of Patent: Apr. 26, 2016

(54) METHOD, SYSTEM, AND DEVICE FOR PERFORMING UPLINK TRANSMISSION

(71) Applicant: China Academy of Telecommunications Technology, Beijing (CN)

(72) Inventors: Qiubin Gao, Beijing (CN); Haijun Zhou, Beijing (CN); Fei Qin, Beijing (CN); Xueming Pan, Beijing (CN); Wei Bao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/397,199

(22) PCT Filed: Apr. 26, 2013

(86) PCT No.: PCT/CN2013/074776
§ 371 (c)(1),
(2) Date: Oct. 27, 2014

(87) PCT Pub. No.: WO2013/159733
PCT Pub. Date: Oct. 31, 2013

(65) Prior Publication Data
US 2015/0071365 A1 Mar. 12, 2015

(30) Foreign Application Priority Data
Apr. 27, 2012 (CN) .......................... 2012 1 0129085

(51) Int. Cl.
*H04L 5/00* (2006.01)
*H04L 27/26* (2006.01)

(52) U.S. Cl.
CPC .............. *H04L 5/003* (2013.01); *H04L 5/0016* (2013.01); *H04L 27/2626* (2013.01); *H04L 27/2627* (2013.01); *H04L 5/0005* (2013.01)

(58) Field of Classification Search
CPC .... H04L 5/003; H04L 5/0005; H04L 27/2627
See application file for complete search history.

(56) References Cited

U.S. PATENT DOCUMENTS

| 2008/0101441 A1* | 5/2008 | Palanki et al. ................ 375/146 |
| 2008/0232449 A1* | 9/2008 | Khan et al. .................... 375/220 |

(Continued)

FOREIGN PATENT DOCUMENTS

| CN | 1694441 A | 11/2005 |
| CN | 101610463 A | 12/2009 |

(Continued)

OTHER PUBLICATIONS

International Search Report for PCT/CN2013/074776.
Extended European Search Report issued on Jun. 1, 2015 in the EP counterpart application (13781039.6).

*Primary Examiner* — Leon Flores
(74) *Attorney, Agent, or Firm* — Kilpatrick Townsend & Stockton LLP

(57) ABSTRACT

The embodiments of the present invention relate to the technical field of wireless communications, and in particular, to a method, system and device for performing uplink transmission, which are used for solving the problems existing in the prior art that the spectrum efficiency and transmission efficiency are relatively low when the uplink transmission is performed in the case that the uplink transmission power is limited. The method of the embodiments of the present invention comprises: user equipment mapping complex symbol data obtained by modulation mapping to Q sub-frames, where Q is a positive integer; the user equipment modulating the complex symbol data mapped to each sub-frame, respectively, so as to generate sending signals corresponding to each sub-frame; and the user equipment sending the sending signals over the corresponding sub-frames. Since the embodiments of the present invention map the data in a data packet into a plurality of sub-frames for transmission, the total transmission power of the user equipment can be correctly received, thereby improving the spectrum efficiency and transmission efficiency when the uplink transmission is performed in the case that the uplink transmission power is limited.

10 Claims, 7 Drawing Sheets

(56) References Cited

U.S. PATENT DOCUMENTS

2009/0186613 A1* 7/2009 Ahn et al. ............... 455/434
2012/0039270 A1* 2/2012 Nguyen et al. .......... 370/329
2012/0140716 A1* 6/2012 Baldemair et al. ...... 370/329
2012/0263124 A1* 10/2012 Gaal et al. .............. 370/329

FOREIGN PATENT DOCUMENTS

| CN | 101636995 A | 1/2010 |
|---|---|---|
| WO | 2005/013530 A1 | 2/2005 |
| WO | 2008/031111 A1 | 3/2008 |

* cited by examiner

METHOD, SYSTEM, AND DEVICE FOR PERFORMING UPLINK TRANSMISSION

This application is a US National Stage of International Application No. PCT/CN2013/074776, filed on Apr. 26, 2013, designating the United States and claiming claims priority to Chinese Patent Application No. 201210129085.4, filed with the Chinese Patent Office on Apr. 27, 2012 and entitled "Uplink transmission method, system and device", the content of which is hereby incorporated by reference in its entirety.

FIELD

The present invention relates to the field of wireless communications and particularly to an uplink transmission method, system and device.

BACKGROUND

In satellite communication and other communication scenarios, the signal strength of uplink transmission is restricted by transmit power of a user equipment, and the transmission performance can not be ensured in the case of a high path loss. Taking a Voice-over-IP service as an example, a data packet including 224 bits is generated every 20 ms, where these 224 bits need to be transmitted in 20 ms. If the 224 bits are transmitted in a Transmission Time Interval (TTI), then there is such a high encoding rate so that the received signal-to-noise ratio of a base station is lower than the demodulation threshold of the data packet, thus the base station can not perform correct demodulation.

There are two existing solutions:

Firstly, the data packet is transmitted repeatedly in time domain, e.g., transmitted repeatedly for 20 times, thus the user equipment transmits the same data packet at a higher total amount of power, and the base station can demodulate correctly the data packet by integrating the data received for 20 times.

A problem of this solution lies in the low spectrum efficiency due to that a Physical Resource Block (PRB) occupied by the user equipment all the time can not be reused by another user equipment.

Secondly, the 224 bits are divided into 20 small data packets which are transmitted in 20 sub-frames. Thus the encoding rate in each sub-frame is lowered accordingly, so the base station can demodulate correctly each small data packet in each sub-frame to thereby resume the original data packet.

A problem of this solution lies in that each of the small data packets into which the data packet is divided will come with an additional overhead, e.g., a Media Access Control (MAC) header overhead, a Cyclic Redundancy Check (CRC) check bit overhead, etc., thus greatly increasing the total overhead and lowering the transmission efficiency.

In summary the spectrum efficiency and the transmission efficiency of uplink transmission may be low at the restricted power of uplink transmission.

SUMMARY

Embodiments of the invention provide an uplink transmission method, system and device so as to address such a problem in the prior art that the spectrum efficiency and the transmission efficiency of uplink transmission may be low at the restricted power of uplink transmission.

An embodiment of the invention provides an uplink transmission method including:

mapping, by a user equipment, complex data symbols obtained by modulation onto Q sub-frames, wherein Q represents a positive integer;

modulating, by the user equipment, the complex data symbols mapped onto each sub-frame respectively into a transmission signal corresponding to each sub-frame; and transmitting, by the user equipment, the transmission signal in corresponding sub-frame.

An embodiment of the invention provides another uplink transmission method including:

de-spreading, by a network-side device, spread signals on Q sub-frames to obtain de-spread data on the respective sub-frames, wherein Q represents a positive integer; and combining, by the network-side device, the de-spread data on the Q sub-frames and performing a reception process on the combined data.

An embodiment of the invention provides a user equipment for uplink transmission, the user equipment including:

a first processing module configured to map complex data symbols obtained by modulation onto Q sub-frames, wherein Q represents a positive integer;

a modulation module configured to modulate the complex data symbols mapped onto each sub-frame respectively into a transmission signal corresponding to each sub-frame; and a transmission module configured to transmit the transmission signal in corresponding sub-frame.

An embodiment of the invention provides a network-side device for uplink transmission, the network-side device including:

a reception module configured to de-spread spread signals on Q sub-frames to obtain de-spread data on the respective sub-frames, wherein Q represents a positive integer; and a second processing module configured to combine the de-spread data on the Q sub-frames and to perform a reception process on the combined data.

An embodiment of the invention provides an uplink transmission system including:

a user equipment configured to map complex data symbols obtained by modulation onto Q sub-frames, wherein Q represents a positive integer; to modulate the complex data symbols mapped onto each sub-frame respectively into a transmission signal corresponding to each sub-frame; and to transmit the transmission signal in corresponding sub-frame.

a network-side device configured to de-spread spread signals on the Q sub-frames to obtain de-spread data on the respective sub-frames, to combine the de-spread data on the Q sub-frames and to perform a reception process on the combined data.

In the embodiments of the invention, data of a data packet is mapped into a plurality of sub-frame for transmission, and the total transmit power of a user equipment is increased by extending a signal in the time domain, thus ensuring the data transmitted by the user equipment to be received correctly so as to improve the spectrum efficiency and the transmission efficiency of uplink transmission at the restricted power of uplink transmission.

DETAILED DESCRIPTION OF THE EMBODIMENTS

In embodiments of the invention, a user equipment maps complex data symbols as a result of modulation onto Q sub-frames, where Q represents a positive integer; modulates the complex data symbols mapped onto each sub-frame respectively into a transmission signal corresponding to each sub-frame; and transmits the transmission signal in the corresponding sub-frame. In the embodiments of the invention, data of a data packet is mapped into a plurality of sub-frames for transmission, and the total transmit power of the user equipment is increased by extending a signal in the time domain, thus ensuring the data transmitted by the user equipment to be received correctly, so as to improve the spectrum efficiency and the transmission efficiency of uplink transmission at the restricted power of uplink transmission.

Particularly the embodiments of the invention use both Frequency Division Multiple Access (FDMA) and Code Division Multiple Access (CDMA) scheme or both Time Division Multiplex Access and CDMA scheme to support concurrent transmission of a plurality of user equipments in each sub-frame, thus ensuring the spectrum efficiency of the system.

Figure 1:
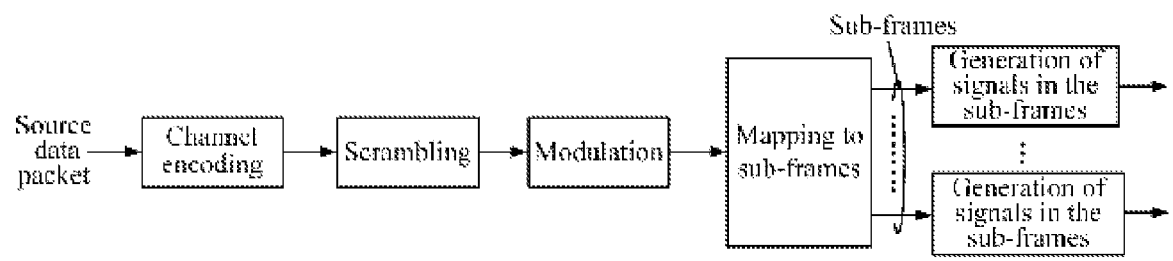
FIG. 1 is a schematic diagram of signal transmission according to an embodiment of the invention.

As illustrated in FIG. 1, there is a schematic diagram of signal transmission according to an embodiment of the invention, where uplink transmission is divided into five processes:

Channel encoding, scrambling, modulation, mapping to sub-frames and generation of signals in the sub-frames.

The embodiments of the invention will be described below in further details with reference to the drawings of the invention.

In the following description, firstly an implementation with cooperation of the network side and the user equipment side will be described, and finally implementations at the network side and the user equipment side will be described respectively. But this will not suggest required cooperation of both the sides for an implementation, and in fact, problems present respectively at the network side and the user equipment side will also be addressed in the separate implementations at the network side and the user equipment side, although a better technical effect can be achieved in the implementation with cooperation of both the sides.

Figure 2:
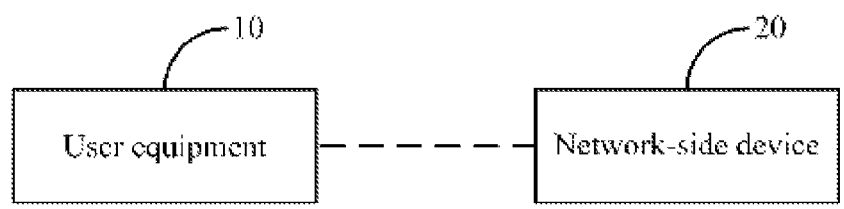
FIG. 2 is a schematic structural diagram of an uplink transmission system according to an embodiment of the invention.

As illustrated in FIG. 2, an uplink transmission system according to an embodiment of the invention includes a user equipment 10 and a network-side device 20.

The user equipment 10 is configured to map complex data symbols obtained by modulation onto Q sub-frames, where Q represents a positive integer: to modulate the complex data symbols mapped onto each sub-frame respectively into a transmission signal corresponding to each sub-frame; and to transmit the transmission signal in the corresponding sub-frame.

The network-side device 20 is configured to de-spread the spread signals on the Q sub-frames to obtain de-spread data on the respective sub-frames, to combine the de-spread data in the Q sub-frames and to perform a reception process on the combined data.

In an implementation, the value of Q can be set as needed, e.g., 4, 8, 16, 20, etc.; or can be determined dependent upon the following factors:

The size of a data packet to be transmitted, where the larger the data packet, the larger the corresponding value of Q needed; and A link quality condition of the user equipment 10, where the better link quality, the smaller the corresponding value of Q.

The value of Q is determined by a received transmission parameter configured by the network-side device 20 for the user equipment 10, or is fixed size pre-defined, or is determined under an agreed mapping rule of the value of Q to another parameter. The other parameter can be the size of a data packet, for example, if the size of a data packet is 144 complex data symbols, and 12 symbols can be transmitted in each sub-frame, then the value of Q should be 144/12=12.

Preferably there are a plurality of schemes in which the user equipment 10 maps the complex data symbols obtained by modulation onto the Q sub-frames, two of which may be listed below:

The first scheme: the user equipment 10 selects sequentially and maps the complex data symbols onto the Q sub-frames.

Particularly the user equipment 10 divides sequentially the complex data symbols into a plurality of groups, each of which is mapped onto a sub-frame, according to the preset number of data symbols mapped onto a sub-frame. For example, if there are 100 complex data symbols, and the number of symbols mapped to each sub-frame is 10, then the symbols 1 to 10 are mapped onto a sub-frame, the symbols 11 to 20 are mapped onto another sub-frame, and so on.

Where the number of data symbols mapped to a sub-frame can be determined by the amount of transmitted data and the value of Q.

In an implementation, for a sub-frame, the user equipment 10 can determine complex data symbols to be mapped to the sub-frame by equation 1:

$$x^q(n) = d(q \times M_{sym}^{SF} + n)$$  Equation 1;

Where $x^q(n)$ represents a n-th complex data symbol mapped onto a sub-frame q; $d(q \times M_{sym}^{SF} + n)$ represents a $(q \times M_{sym}^{SF} + n)$-th complex data symbol; $M_{sym}^{SF}$ represents the amount of complex data symbols mapped onto the sub-frame q, and $M_{sym}$ represents the amount of complex data symbols: q represents a sub-frame index, and q=0, 1, ... Q−1; and n represents an index of the complex data symbol mapped to a sub-frame, and n=0, 1, ... $M_{sym}^{SF} - 1$.

In an implementation, the amount $M_{sym}^{SF}$ of complex data symbols mapped onto the sub-frame q is determined by a received network-side indication, or determined by the equation $M_{sym}^{SF} = M_{sym}/Q$.

Accordingly the network-side device 20 combines the de-spread data on the Q sub-frames in the order of sub-frames.

For example if there are 10 de-spread data in each sub-frame, then the first to tenth data in the combined data sequence are the de-spread data in the first sub-frame, the eleventh to twentieth data are the de-spread data in the second sub-frame, and so on.

Where the number of data symbols mapped to a sub-frame can be determined by the amount of transmitted data and the value of Q.

In an implementation, the network-side device 20 combines the obtained transmission signals by the equation 2:

$$d(m)=x^q(n) \qquad \text{Equation 2;}$$

Where $q=\lfloor m/M_{sym}^{SF} \rfloor$, $n=m-q \times M_{sym}^{SF}$; d(m) represents the m-th data after combining; $x^q(n)$ represents the n-th de-spread data in the sub-frame q; $M_{sym}^{SF}$ represents the amount of dc-spread data in the sub-frame q, and $M_{sym}^{SF}=M_{sym}/Q$; and q represents the sub-frame index, and q=0, 1, . . . Q−1.

Second scheme: the user equipment 10 selects at an interval and maps the complex data symbols onto the Q sub-frames.

Particularly the user equipment 10 divides the complex data symbols into a plurality of groups, each of which is mapped onto a sub-frame, at an interval of a preset number of symbols. For example, if there are 30 complex data symbols, and the interval of a preset number of symbols is 10, then the symbols 1, 11 and 21 are mapped onto a sub-frame, the symbols 2, 12 and 22 are mapped onto another sub-frame, and so on.

Where the interval of a number of symbols can be equal to the number Q of sub-frames, or derived from a transmission parameter configured by the network side.

In an implementation, for a sub-frame, the user equipment 10 can determine complex data symbols to be mapped to the sub-frame by the equation 3:

$$x^q(n)=d(q+n \times Q) \qquad \text{Equation 3;}$$

Where $x^q(n)$ represents the complex data symbol mapped onto a sub-frame q; $d(q+n \times Q)$ represents the $(q+n \times Q)$-th complex data symbol; $M_{sym}^{SF}$ represents the amount of complex data symbols mapped onto the sub-frame q, $M_{sym}^{SF}=M_{sym}/Q$, and $M_{sym}$ represents the amount of complex data symbols; q represents the sub-frame index, and q=0, 1, . . . Q−1; and n represents an index of the complex data symbol mapped to a sub-frame, and =0, 1, . . . $M_{sym}^{SF}-1$.

Accordingly, the network-side device 20 selects at the interval and combines the de-spreaded data on the Q sub-frames.

For example if there are 30 complex data symbols in each sub-frame, there are ten sub-frames in total, and the interval of a preset number of symbols is 10, then the first de-spread data in each sub-frame of sub-frames 1 to 10 is arranged in sequence at the first to tenth locations in the combined data, the second de-spread data in each sub-frame of sub-frames 1 to 10 is arranged in sequence at the eleventh to twenty-first locations in the combined data, and so on, and finally the arranged data are combined.

In an implementation, the network-side device 20 combines the obtained transmission signals by the equation 4:

$$d(m)=x^q(n) \qquad \text{Equation 4;}$$

Where $n=\lfloor m/Q \rfloor$, $q=m-n \times Q$; d(m) represents the m-th data after combining; $x^q(n)$ represents the n-th de-spread data in the sub-frame q, and n=0, 1, . . . $M_{sym}^{SF}-1$; $M_{sym}^{SF}$ represents the amount of de-spread data in the sub-frame q, and $M_{sym}^{SF}=M_{sym}/Q$; and q represents the sub-frame index, and q=0, 1, . . . Q−1.

Preferably for a complex data symbol in a sub-frame, the user equipment 10 spreads the complex data symbol by a spread code to obtain a sequence of spread data corresponding to the complex data symbol, maps the sequence of spread data onto time-frequency resources and modulates the sequence of spread data on the time-frequency resources into Orthogonal Frequency Division Multiplexing (OFDM) symbols.

Generation of a transmission signal in a sub-frame may be described taking the sub-frame q as an example, and the same may apply to generation of the other sub-frames, so a repeated description thereof may be omitted. Data symbols mapped to the sub-frame q are $x^q(0), \ldots, x^q(M_{sym}^q-1)$. Assumed that Nsc data sub-carriers and L OFDM symbols for data transmission in a sub-frame in a transmission bandwidth range of the user equipment. Each data symbol is spread by a spread code with a length of $N_{SF}$, where the spread code is represented as $$[w_0, w_1, \ldots w_{N_{SF}-1}],$$

and $x^q(n)$ is spread into a sequence of spread data $y^q(n,l)=x^q(n)w_l$. The sequence of spread data is mapped onto time-frequency resources under a specific rule. The sequence of spread data mapped onto each OFDM symbol is subjected to an OFDM modulation or Discrete Fourier Transformation-Spread-Orthogonal Frequency Division Multiplexing (DFT-S-OFDM) modulation to generate an OFDM symbol.

Preferably the user equipment 10 maps the sequence of spread data onto the time-frequency resources in three schemes, which may be listed below respectively.

Figure 3:
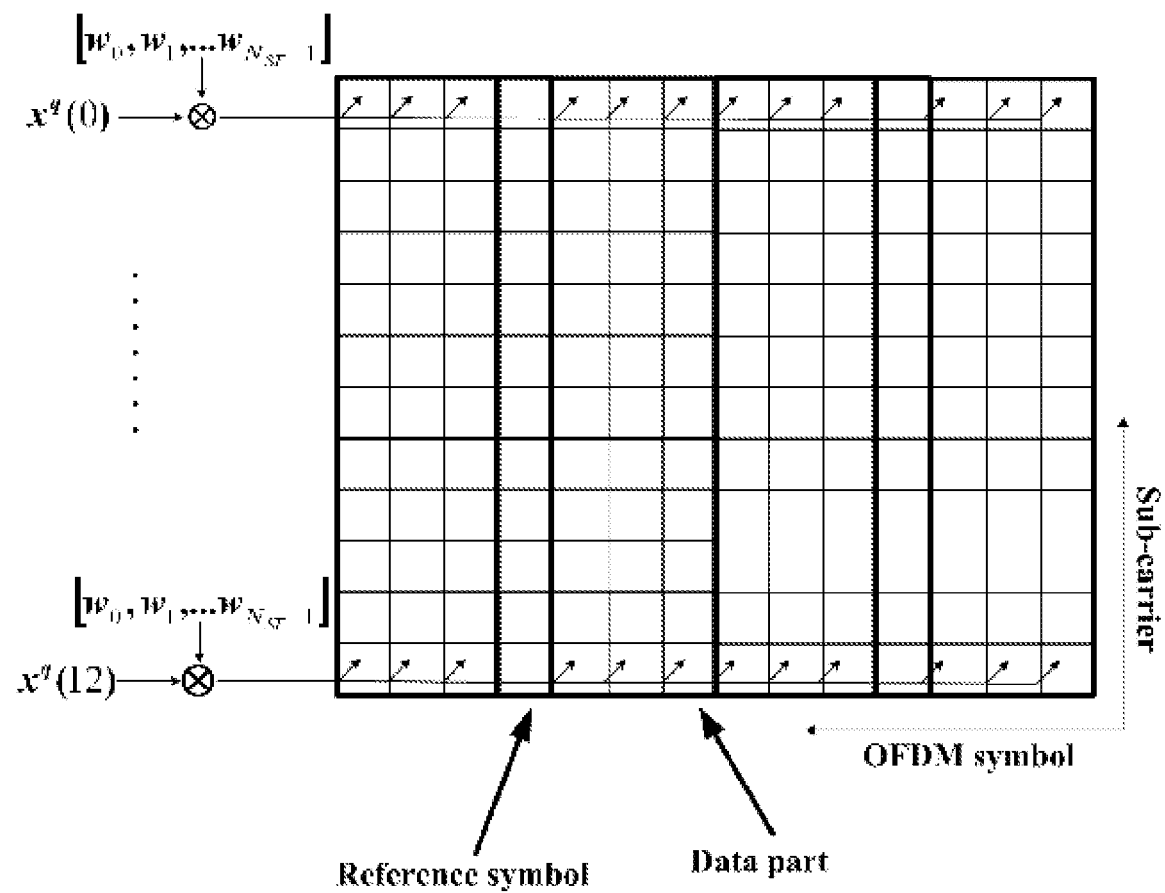
FIG. 3 is a schematic diagram of spreading in the time domain according to an embodiment of the invention.

First mapping scheme, the user equipment 10 can map a sequence of spread data corresponding to a complex data symbol onto the same sub-carrier of different OFDM symbols through spreading in the time domain, particularly as illustrated in FIG. 3.

For example there are 12 data sub-carriers in the transmission bandwidth range of the user equipment 10, there are 12 OFDM symbols for data transmission in a sub-frame, the length of a spread code is 12, and a sequence of spread data with the length of 12 corresponding to a data symbol is mapped respectively onto the same data sub-carrier of 12 OFDM symbols. Sequences of spread data corresponding to different data symbols are mapped onto different data sub-carriers. In this case, the user equipment 10 can transmit at most 12 data symbols in a sub-frame using a spread code, where a data symbol is transmitted over each sub-carrier. In an implementation, there may be a plurality of spread codes among transmission parameters so that the user equipment 10 can use the plurality of spread codes for a larger number of data symbols transmitted in each sub-frame.

Figure 4:
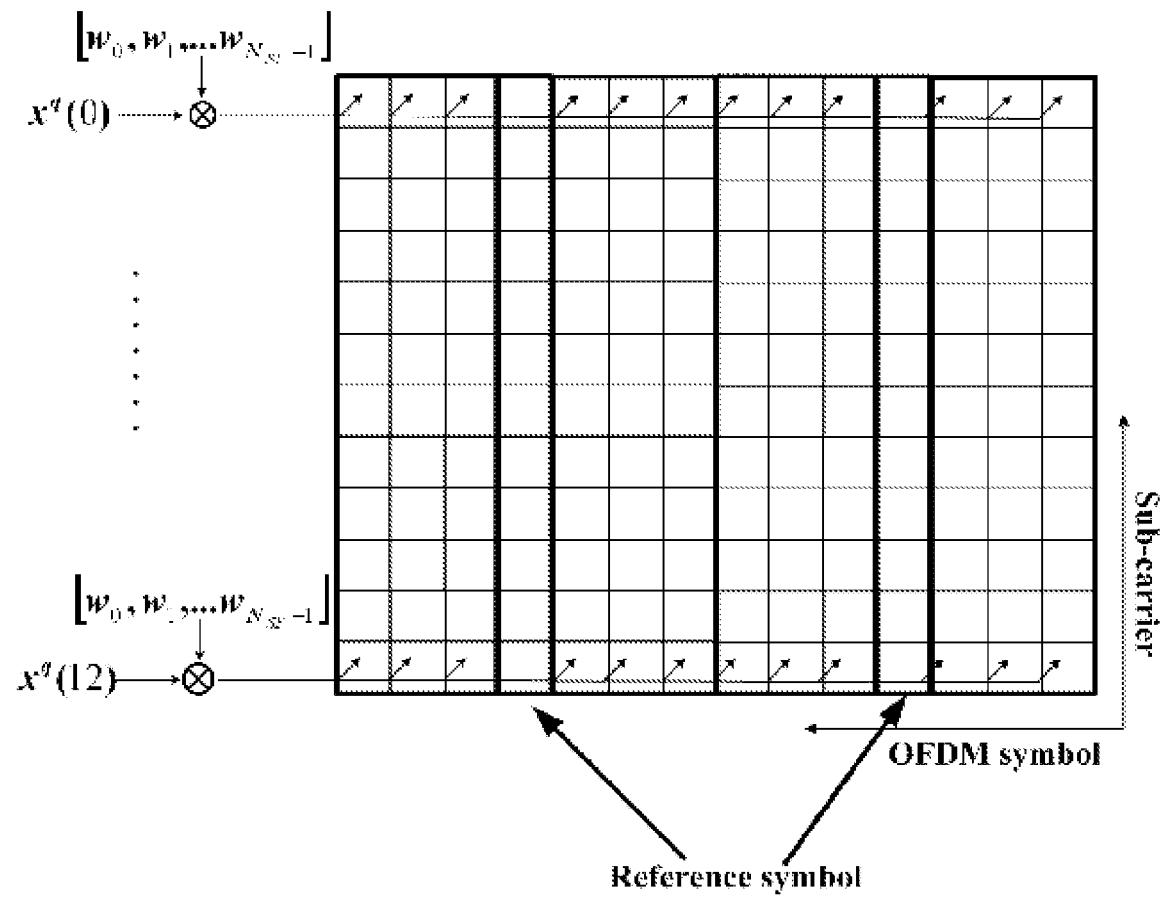
FIG. 4 is a schematic diagram of spreading in the frequency domain according to an embodiment of the invention.

Second mapping scheme, the user equipment 10 can map a sequence of spread data corresponding to a complex data symbol onto a plurality of sub-carriers of the same OFDM symbol through spreading in the frequency domain, particularly as illustrated in FIG. 4.

For example there are 12 data sub-carriers in the transmission bandwidth range of the user equipment 10, there are 12 OFDM symbols for data transmission in a sub-frame, the length of a spread code is 12, and a sequence of spread data with the length of 12 corresponding to a data symbol is mapped respectively onto 12 data sub-carriers of the same OFDM symbol. Sequences of spread data corresponding to different data symbols are mapped onto different OFDM symbols. In this case, the user equipment can transmit at most 12 data symbols in a sub-frame using a spread code, where a data symbol is transmitted in each OFDM symbol. In an implementation, there may be a plurality of spread codes among transmission parameters so that the user equipment 10 can use the plurality of spread codes for a larger number of data symbols transmitted in each sub-frame.

Figure 5:
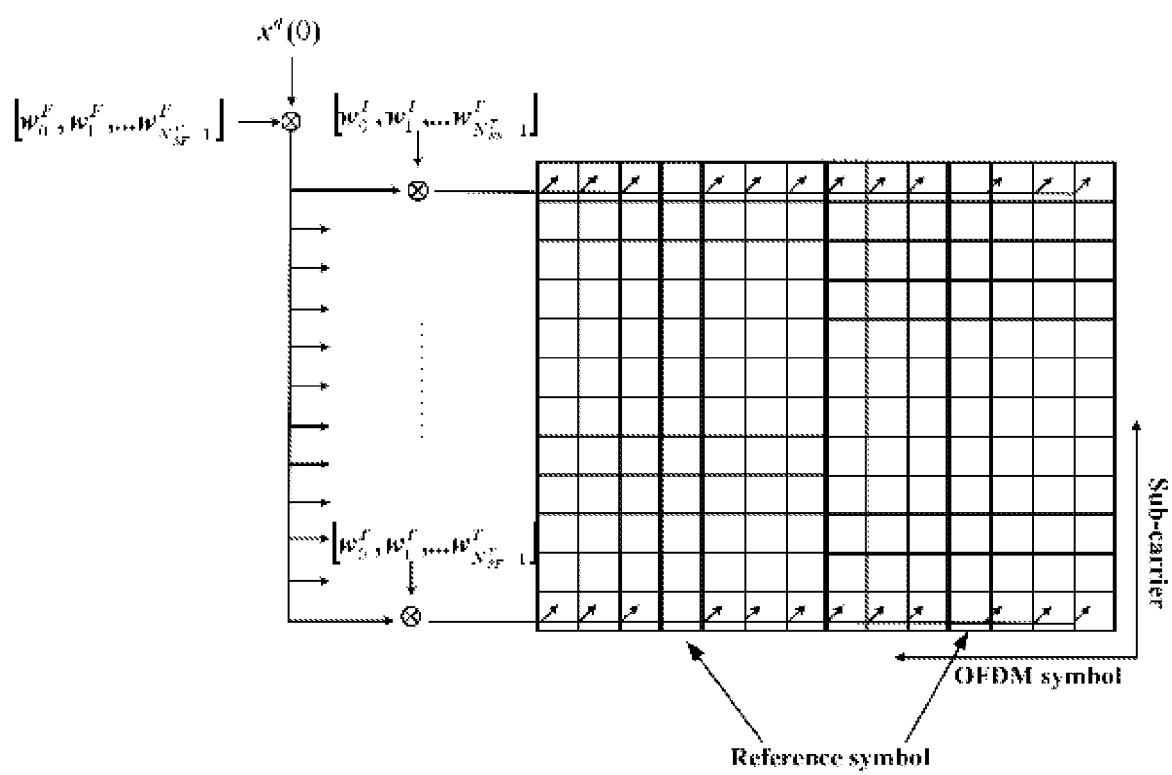
FIG. 5 is a schematic diagram of spreading both in the time domain and in the frequency domain according to an embodiment of the invention.

Third mapping scheme, the user equipment 10 can map a sequence of spread data corresponding to a complex data symbol onto a plurality of sub-carriers of a plurality of OFDM symbols through spreading in both the time and frequency domains, particularly as illustrated in FIG. 5.

For example there are 12 data sub-carriers in the transmission bandwidth range of the user equipment 10, there are 12 OFDM symbols for data transmission in a sub-frame, the length of a spread code is 144, and a sequence of spread data with the length of 144 corresponding to a data symbol is mapped respectively onto 12 data sub-carrier of 12 OFDM symbols. In this case, the user equipment can transmit at most one data symbol in a sub-frame using a spread code. A base station can configure the user equipment with a plurality of spread codes to increase the number of data symbols transmitted in each sub-frame. Spreading in both the time and frequency domains can be performed at two levels of spreading, that is, firstly a data symbol is spread at a first level using a frequency (or time)-spread sequence, and then the spread sequence is spread at a second level using a time (or frequency)-spread sequence, particularly as illustrated in FIG. 5.

Preferably the user equipment 10 can map the sequence of spread data onto the time-frequency resources by mapping the sequence of spread data onto all or a part of the time-frequency resources.

Figure 6:
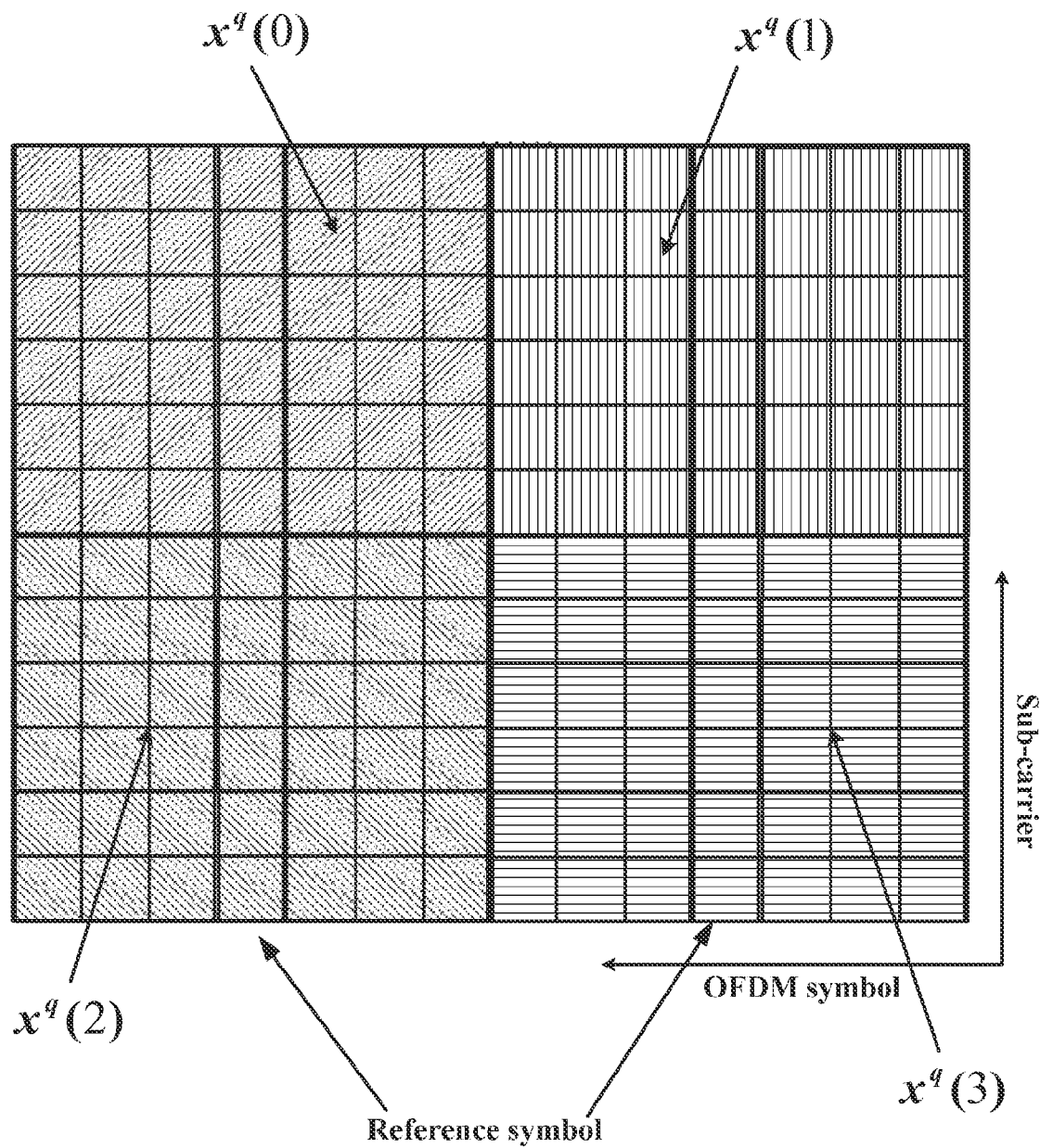
FIG. 6 is a schematic diagram of mapping to a part of time-frequency resources according to an embodiment of the invention.

Particularly the user equipment 10 can map the sequence of spread data onto all of the time-frequency resources or a part of the time-frequency resources by selecting the length of the spread code. In the latter case, a plurality of data symbols of the user equipment can be transmitted concurrently over different time-frequency resources. For example, four data symbols are mapped respectively to four time-frequency zones through spreading, particularly as illustrated in FIG. 6.

Where data symbols of different user equipments 10 can also be transmitted in different time-frequency zones.

In an implementation, the user equipment 10 further needs to perform channel encoding, scrambling and modulation before mapping the complex data symbols obtained by modulation onto the Q sub-frame, particularly as illustrated in FIG. 1:

Channel encoding: a source data block including N-bit data $s(0), \ldots, s(N_{bit}-1)$ is channel-encoded into a data block with the length of M bits $b(0), \ldots, b(M_{bit}-1)$;

Scrambling: the channel-encoded data block $b(0), \ldots, b(M_{bit}-1)$ is scrambled into a scrambled data block $\tilde{b}(0), \ldots, \tilde{b}(M_{bit}-1)$.

Constellation mapping: the scrambled data block $\tilde{b}(0), \ldots, \tilde{b}(M_{bit}-1)$ is constellation-mapped into a complex data symbol block $d(0), \ldots, d(M_{sym}-1)$ including $M_{sym}$ complex data symbols. A particular mapping scheme can be Binary Phase Shift Keying (BPSK), Quadrature Phase Shift Keying (QPSK), 16-Quadrature Amplitude Modulation (16QAM), 64QAM, etc.

Accordingly, the network-side device 20 performs the reception process on the combined data by performing:

Demodulation, de-scrambling and decoding.

Where the user equipment 10 and the network-side device 20 can perform the transmission process above according to transmission parameters.

The transmission parameters include but may not be limited to at least one of the following information:

The number of bundled sub-frames (i.e., the value of Q), the amount of complex data symbols mapped onto a sub-frame, time-frequency resources occupied in each sub-frame (i.e., a spreading scheme), a spread code, a mapped sub-frame(s) (mapped sub-frames are separate in time domain), a mapped first sub-frame (mapped sub-frames are consecutive), a mapping scheme to a sub-frame, the number of data symbols mapped to a sub-frame in the course of mapping to the sub-frame, an interval of a number of symbols in the course of mapping to a sub-frame, and a mapping scheme to time-frequency resources.

In an implementation, the transmission parameters can be defined in a protocol in advance or can be configured by the network-side device 20: or a part of information in the transmission parameters can be defined in the protocol in advance, and another part of the information can be configured by the network-side device 20. Either of the options will be possible as long as the same parameters are determined by the user equipment 10 and the network-side device 20 for uplink transmission.

If the transmission parameters need to be configured by the network-side device 20, then preferably the network-side device 20 configures the user equipment 10 with the transmission parameters.

Particularly the network-side device 20 configures the user equipment with the transmission parameters semi-statically in higher-layer signaling: or configures the user equipment with the transmission parameters in control signaling to schedule uplink transmission.

It shall be noted that the embodiment of the invention will not be limited to the two configuration schemes above, but any other scheme in which the user equipment 10 can be configured with the transmission parameters will be applicable to the embodiment of the invention.

For the network-side device 20, those sub-frames to which the user equipment 10 maps the data respectively can be known due to the knowledge of the transmission parameters of the user equipment 10, and correspondingly the network-side device 20 can obtain and combine the data from the user equipment in the corresponding sub-frames and de-spread and further perform the reception process on the combined data.

Particularly the network-side device according to the embodiment of the invention can be a base station (e.g., a macro base station, a femto base station, etc.) or can be a Relay Node (RN) device or can be another network-side device.

Figure 7:
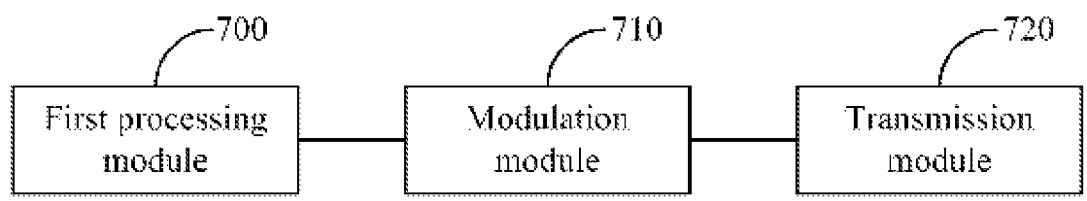
FIG. 7 is a schematic structural diagram of a user equipment in an uplink transmission system according to an embodiment of the invention.

As illustrated in FIG. 7, a user equipment in an uplink transmission system according to an embodiment of the invention includes a first processing module 700, a modulation module 710 and a transmission module 720.

The first processing module 700 is configured to map complex data symbols obtained by modulation onto Q sub-frames, where Q represents a positive integer;

The modulation module 710 is configured to modulate the complex data symbols mapped onto each sub-frame respectively into a transmission signal corresponding to each sub-frame; and The transmission module 720 is configured to transmit the transmission signal in the corresponding sub-frame.

Preferably the first processing module 700 determines the value of Q from a transmission parameter;

Preferably the first processing module 700 maps the complex data symbols obtained by modulation onto the Q sub-frames in a number of schemes, two of which will be listed below:

First scheme, the first processing module 700 selects sequentially and maps the complex data symbols onto the Q sub-frames.

Preferably for a sub-frame, the first processing module 700 determines complex data symbols to be mapped to the sub-frame by the equation 1.

Second scheme, the first processing module 700 selects at an interval and maps the complex data symbols onto the Q sub-frames.

Preferably for a sub-frame, the first processing module 700 determines complex data symbols to be mapped to the sub-frame by the equation 3.

Preferably for a complex data symbol in a sub-frame, the modulation module 710 spreads the complex data symbol by a spread code to obtain a sequence of spread data corresponding to the complex data symbol, maps the sequence of spread data onto time-frequency resources and modulates the sequence of spread data on the time-frequency resources to generate Orthogonal Frequency Division Multiplexing (OFDM) symbols.

Preferably the modulation module 710 maps the sequence of spread data onto all or a part of the time-frequency resources.

Preferably the modulation module 710 maps a sequence of spread data corresponding to a complex data symbol onto the same sub-carrier of different OFDM symbols through spreading in the time domain; or maps a sequence of spread data corresponding to a complex data symbol onto a plurality of sub-carriers of the same OFDM symbol through spreading in the frequency domain; or maps a sequence of spread data corresponding to a complex data symbol onto a plurality of sub-carriers of a plurality of OFDM symbols through spreading in both the time and frequency domains.

Preferably the modulation module 710 determines time-frequency resources in each sub-frame according to transmission parameters.

Figure 8:
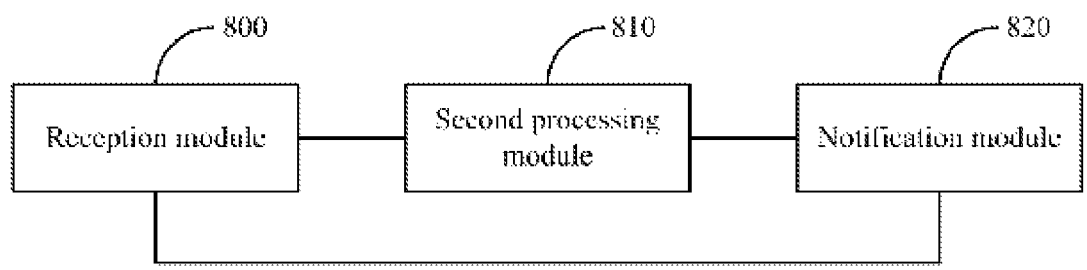
FIG. 8 is a schematic structural diagram of a network-side device in an uplink transmission system according to an embodiment of the invention.

As illustrated in FIG. 8, a network-side device in an uplink transmission system according to an embodiment of the invention includes a reception module 800 and a second processing module 810.

The reception module 800 is configured to de-spread spread signals on Q sub-frames to obtain de-spread data on the respective sub-frames, where Q represents a positive integer; and The second processing module 810 is configured to combine the de-spread data on the Q sub-frames and to perform a reception process on the combined data.

Preferably the second processing module 810 combines the de-spread data on the Q sub-frames in the order of sub-frames.

Particularly the second processing module 810 combines obtained transmission signals by the equation 2.

Preferably the second processing module 810 selects at an interval and combines the de-spread data on the Q sub-frames.

Particularly the second processing module 810 combines obtained transmission signals by the equation 4.

Preferably the network-side device according to the embodiment of the invention can further include a notification module 820.

The notification module 820 is configured to configure a user equipment with transmission parameters.

Preferably the notification module 820 configures the user equipment with the transmission parameters semi-statically in higher-layer signaling; or configures the user equipment with the transmission parameters in control signaling which schedules uplink transmission.

Based upon the same inventive idea, embodiments of the invention further provide an uplink transmission method of a user equipment and an uplink transmission method of a network-side device, and since these methods address the problem under a similar principle to the uplink transmission system according to the embodiment of the invention, reference can be made to the implementation of the system for implementations of these methods, so a repeated description thereof will be omitted here.

Figure 9:
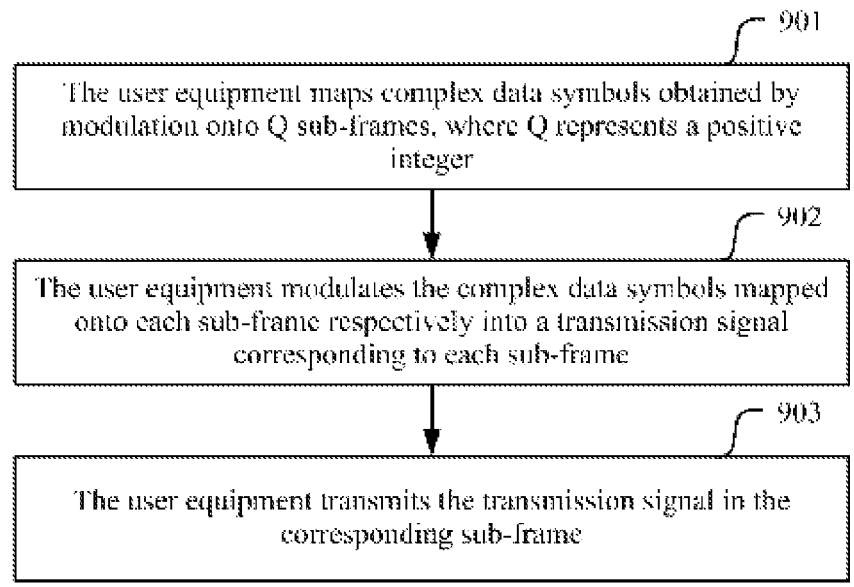
FIG. 9 is a schematic flow chart of an uplink transmission method of a user equipment according to an embodiment of the invention.

As illustrated in FIG. 9, an uplink transmission method of a user equipment according to an embodiment of the invention includes the operations:

In the operation 901, the user equipment maps complex data symbols obtained by modulation onto Q sub-frames, where Q represents a positive integer;

In the operation 902, the user equipment modulates the complex data symbols mapped onto each sub-frame respectively into a transmission signal corresponding to each sub-frame; and In the operation 903, the user equipment transmits the transmission signal in the corresponding sub-frame.

Preferably in the operation 901, the user equipment maps the complex data symbols obtained by modulation onto the Q sub-frames in a number of schemes, two of which may be listed below:

First scheme, the user equipment selects sequentially and maps the complex data symbols onto the Q sub-frames.

Particularly the user equipment divides sequentially the complex data symbols into a plurality of groups, each of which is mapped onto a sub-frame, according to the preset number of data symbols mapped onto a sub-frame. For example, if there are 100 complex data symbols, and the number of data symbols mapped to a sub-frame is 10, then the symbols 1 to 10 are mapped onto a sub-frame, the symbols 11 to 20 are mapped onto another sub-frame, and so on.

Where the number of data symbols mapped to a sub-frame can be determined by the amount of transmitted data and the value of Q.

In an implementation, for a sub-frame, the user equipment can determine complex data symbols to be mapped to the sub-frame by the equation 1.

Second scheme, the user equipment selects at an interval and maps the complex data symbols onto the Q sub-frames.

Particularly the user equipment divides the complex data symbols into a plurality of groups, each of which is mapped onto a sub-frame, at an interval of a preset number of symbols.

For example, if there are 30 complex data symbols, and the interval of a preset number of symbols is 10, then the symbols 1, 11 and 21 are mapped onto a sub-frame, the symbols 2, 12 and 22 are mapped onto another sub-frame, and so on.

Where the interval of a number of symbols can be equal to the number Q of sub-frames or derived from a transmission parameter configured by the network side.

In an implementation, for a sub-frame, the user equipment can determine complex data symbols to be mapped to the sub-frame by the equation 3.

Preferably in the operation 902, for a complex data symbol in a sub-frame, the user equipment spreads the complex data symbol by a spread code to obtain a sequence of spread data corresponding to the complex data symbol, maps the sequence of spread data onto time-frequency resources and modulates the sequence of spread data on the time-frequency resources to generate OFDM symbols.

Generation of a transmission signal in a sub-frame may be described taking a sub-frame q as an example, and the same may apply to generation of the other sub-frames, so a repeated description thereof may be omitted. Data symbols mapped to the sub-frame q are $x^q(0), \ldots, x^q(M_{sym}^q-1)$. Assumed that Nsc data sub-carriers and L OFDM symbols for data transmission in a sub-frame in a transmission bandwidth range of the user equipment. Each data symbol is spread by a spread code with the length of $N_{SF}$, where the spread code is represented as $$[w_0, w_1, \ldots w_{N_{SF}-1}],$$

and $x^q(n)$ is spread into a sequence of spread data $y^q(n,l)=x^q(n)w_l$. The sequence of spread data is mapped onto time-frequency resources under a specific rule. The sequence of spread data mapped onto each OFDM symbol is subjected to an OFDM modulation or DFT-S-OFDM modulation to generate an OFDM symbol.

Preferably the user equipment maps the sequence of spread data onto the time-frequency resources in three schemes, which may be listed below respectively.

A first mapping scheme, the user equipment can map a sequence of spread data corresponding to a complex data symbol onto the same sub-carrier of different OFDM symbols through spreading in the time domain, particularly as illustrated in FIG. 3.

A second mapping scheme, the user equipment 10 can map a sequence of spread data corresponding to a complex data symbol onto a plurality of sub-carriers of the same OFDM symbol through spreading in the frequency domain, particularly as illustrated in FIG. 4.

A third mapping scheme, the user equipment 10 can map a sequence of spread data corresponding to a complex data symbol onto a plurality of sub-carriers of a plurality of OFDM symbols through spreading in both the time and frequency domains, particularly as illustrated in FIG. 5.

Preferably the user equipment can map the sequence of spread data onto the time-frequency resources by mapping the sequence of spread data onto all or a part of the time-frequency resources.

Particularly the user equipment can map the sequence of spread data onto all of the time-frequency resources or a part of the time-frequency resources by selecting the length of the spread code. In the latter case, a plurality of data symbols of the user equipment can be transmitted concurrently over different time-frequency resources. For example, four data symbols are mapped respectively to four time-frequency zones through spreading, particularly as illustrated in FIG. 6.

Where data symbols of different user equipments can also be transmitted in different time-frequency zones.

In an implementation, the user equipment further needs to perform channel encoding, scrambling and modulation before the operation 901, particularly as illustrated in FIG. 1:

Channel encoding: a source data block including N-bit data $s(0), \ldots, s(N_{bit}-1)$ is channel-encoded into a data block with the length of M bits $b(0), \ldots, b(M_{bit}-1)$;

Scrambling: the channel-encoded data block $b(0), \ldots, b(M_{bit}-1)$ is scrambled into a scrambled data block $\tilde{b}(0), \ldots, \tilde{b}(M_{bit}-1)$.

Constellation mapping: the scrambled data block $\tilde{b}(0), \ldots, \tilde{b}(M_{bit}-1)$ is constellation-mapped into a complex data symbol block $d(0), \ldots, d(M_{sym}-1)$ including $M_{sym}$ complex data symbols. A particular mapping scheme can be BPSK, QPSK, 16QAM, 64QAM, etc.

Where the user equipment can perform the transmission process above according to transmission parameters.

In an implementation, the transmission parameters can be defined in a protocol in advance or can be configured by a network-side device; or a part of information in the transmission parameters can be defined in the protocol in advance, and another part of the information can be configured by the network-side device. Either of the options will be possible as long as the same parameters are determined by the user equipment and the network-side device for uplink transmission.

For the network-side device, those sub-frames to which the user equipment maps the data respectively can be known due to the knowledge of the transmission parameters of the user equipment, and correspondingly the network-side device can obtain and combine the data from the user equipment in the corresponding sub-frames and de-spread and further perform the reception process on the combined data.

Figure 10:
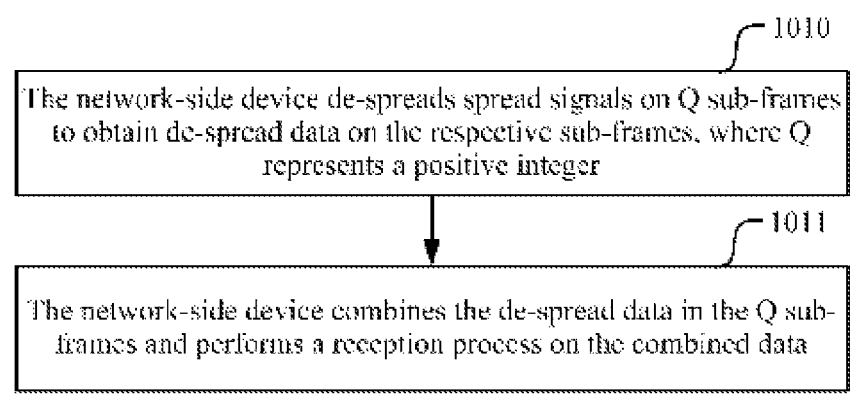
FIG. 10 is a schematic flow chart of an uplink transmission method of a network-side device according to an embodiment of the invention.

As illustrated in FIG. 10, an uplink transmission method of a network-side device according to an embodiment of the invention includes the following operations:

In the operation 1010, the network-side device de-spreads spread signals on Q sub-frames to obtain de-spread data on the respective sub-frames, where Q represents a positive integer; and In the operation 1011, the network-side device combines the de-spread data on the Q sub-frames and performs a reception process on the combined data.

Preferably in the operation 1011, if a user equipment selects sequentially and maps complex symbol data onto the Q sub-frames, then the network-side device combines the de-spread data on the Q sub-frames in the order of sub-frames.

For example if there are 10 de-spread data in each sub-frame, then the first to tenth data in the combined sequence of data are the de-spread data in the first sub-frame, the eleventh to twentieth data are the de-spread data in the second sub-frame, and so on.

Where the number of data symbols mapped to a sub-frame can be determined by the amount of transmitted data and the value of Q.

In an implementation, the network-side device combines obtained transmission signals by the equation 2.

Preferably in the operation 1011, if a user equipment selects at an interval and maps complex data symbols onto the Q sub-frames, then the network-side device combines the de-spread data on the Q sub-frames at the interval.

Particularly the network-side device extracts at the interval of a preset number of symbols and then combines the de-spread data in the Q sub-frames. If there are 30 complex data symbols, and the interval of a preset number of symbols is 10, then the first, eleventh and twenty-first symbols are arranged at the front, the second, twelfth and twenty-second symbols are arranged next, and so on, and finally the arranged data are combined.

Where the interval of a number of symbols can be equal to the number Q of sub-frames or derived from a transmission parameter configured by the network side.

In an implementation, the network-side device combines obtained transmission signals by the equation 4.

In the operation 1011, the network-side device performs the reception process on the combined data by performing:

Demodulation, De-Scrambling and Decoding.

Where the network-side device can perform the transmission process above according to transmission parameters.

In an implementation, the transmission parameters can be defined in a protocol in advance or can be configured by the network-side device; or a part of information in the transmission parameters can be defined in the protocol in advance, and another part of the information can be configured by the network-side device. Either of the options will be possible as long as the same parameters are determined by the user equipment and the network-side device for uplink transmission.

If the transmission parameters need to be configured by the network-side device, then preferably the network-side device configures the user equipment with the transmission parameters.

Particularly the network-side device configures the user equipment with the transmission parameters semi-statically in higher-layer signaling; or configures the user equipment with the transmission parameters in control signaling which schedules uplink transmission.

It shall be noted that the embodiment of the invention will not be limited to the two configuration schemes above but any other scheme in which the user equipment can be configured with the transmission parameters will be applicable to the embodiment of the invention.

For the network-side device, those sub-frames to which the user equipment maps the data respectively can be known due to the knowledge of the transmission parameters of the user equipment, and correspondingly the network-side device can obtain and combine the data from the user equipment in the corresponding sub-frames and de-spread and further perform the reception process on the combined data.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An uplink transmission method, comprising:

mapping, by a user equipment, complex data symbols obtained by modulation onto Q sub-frames, wherein Q represents a positive integer;

modulating, by the user equipment, the complex data symbols mapped onto each sub-frame respectively into a transmission signal corresponding to each sub-frame; and transmitting, by the user equipment, the transmission signal in corresponding sub-frame;

wherein the mapping, by the user equipment, complex data symbols obtained by modulation onto the Q sub-frames comprises: the user equipment selecting sequentially and mapping the complex data symbols onto the Q sub-frames; and for a sub-frame, the user equipment determines complex data symbols to be mapped to the sub-frame by an equation of:

$$x^q(n) = d(q \times M_{sym}^{SF} + n),$$

wherein $x^q(n)$ represents a n-th complex data symbol mapped onto a sub-frame q; $d(q \times M_{sym}^{SF} + n)$ represents a $(q \times M_{sym}^{SF} + n)$-th complex data symbol; $M_{sym}^{SF}$ represents an amount of complex data symbols mapped onto the sub-frame q; q represents a sub-frame index and q=0, 1, ... Q−1; and n represents an index of the complex data symbol mapped to a sub-frame, and n=0, 1, ... $M_{sym}^{SF}$−1;

or wherein the mapping, by the user equipment, the complex data symbols obtained by modulation onto the Q sub-frames comprises:

selecting, by the user equipment, at an interval and mapping the complex data symbols onto the Q sub-frames; and for a sub-frame, the user equipment determines complex data symbols to be mapped to the sub-frame by an equation of:

$$x^q(n) = d(q + n \times Q),$$

wherein $x^q(n)$ represents the complex data symbol mapped onto a sub-frame q; $d(q+n \times Q)$ represents a $(q+n \times Q)$-th complex data symbol: $M_{sym}^{SF}$ represents an amount of complex data symbols mapped onto the sub-frame q; q represents a sub-frame index, and q=0, 1, ... Q−1; and n represents an index of the complex data symbol mapped to a sub-frame, and n=0, 1, ... $M_{sym}^{SF}$−1.

2. The method according to claim 1, wherein the modulating, by the user equipment, the complex data symbols mapped onto each sub-frame respectively into the transmission signal corresponding to each sub-frame comprises:
for a complex data symbol in a sub-frame, spreading, by the user equipment, the complex data symbol by a spread code to obtain a sequence of spread data corresponding to the complex data symbol; and
mapping, by the user equipment, the sequence of spread data onto time-frequency resources and modulating the sequence of spread data on the time-frequency resources to generate OFDM symbols.

3. The method according to claim 2, wherein the mapping, by the user equipment, the sequence of spread data onto the time-frequency resources comprises:
mapping, by the user equipment, the sequence of spread data onto all or a part of the time-frequency resources.

4. The method according to claim 3, wherein the mapping, by the user equipment, the sequence of spread data onto the time-frequency resources comprises:
mapping, by the user equipment, a sequence of spread data corresponding to a complex data symbol onto a same sub-carrier of different OFDM symbols through spreading in the time domain; or
mapping, by the user equipment, a sequence of spread data corresponding to a complex data symbol onto a plurality of sub-carriers of a same OFDM symbol through spreading in the frequency domain; or
mapping, by the user equipment, a sequence of spread data corresponding to a complex data symbol onto a plurality of sub-carriers of a plurality of OFDM symbols through spreading in both the time and frequency domains.

5. An uplink transmission method, comprising:
de-spreading, by a network-side device, spread signals on Q sub-frames to obtain de-spread data on the respective sub-frames, wherein Q represents a positive integer; and
combing, by the network-side device, the de-spread data on the Q sub-frames and performing a reception process on the combined data;
wherein the network-side device combines obtained transmission signals by an equation of:

$$d(m)=x^q(n),$$

wherein $q=\lfloor m/M_{sym}^{SF} \rfloor$, $n=m-q \times M_{sym}^{SF}$; $d(m)$ represents m-th data after combining; $x^q(n)$ represents n-th de-spread data in a sub-frame q; $M_{sym}^{SF}$ represents an amount of de-spread data in the sub-frame q; and q represents a sub-frame index;
or
wherein the network-side device combines obtained transmission signals by an equation of:

$$d(m)=x^q(n),$$

wherein $n=\lfloor m/Q \rfloor$, $q=m-n \times Q$; $d(m)$ represents m-th data after combining; $x^q(n)$ represents n-th de-spread data in a sub-frame q; and q represents a sub-frame index.

6. A user equipment for an uplink transmission, the user equipment comprising:
a first processing module configured to map complex data symbols obtained by modulation onto Q sub-frames, wherein Q represents a positive integer;
a modulation module configured to modulate the complex data symbols mapped onto each sub-frame respectively into a transmission signal corresponding to each sub-frame; and
a transmission module configured to transmit the transmission signal in corresponding sub-frame;

wherein the first processing module is configured; to select sequentially and map the complex data symbols onto the Q sub-frames; and for a sub-frame, the first processing module determines complex data symbols to be mapped to the sub-frame by an equation of:

$$x^q(n)=d(q \times M_{sym}^{SF}+n),$$

wherein $x^q(n)$ represents a n-th complex data symbol mapped onto a sub-frame q; $d(q \times M_{sym}^{SF}+n)$ represents a $(q \times M_{sym}^{SF}+n)$-th complex data symbol; $M_{sym}^{FS}$ represents an amount of complex data symbols mapped onto the sub-frame q; q represents a sub-frame index and q=0, 1, ... Q−1; and n represents an index of the complex data symbol mapped to a sub-frame, and n=0, 1 ... $M_{sym}^{SF}$−1;
or
the first processing module is configured; to select at an interval and map the complex data symbols onto the Q sub-frames; and for a sub-frame, the first processing module determines complex data symbols to be mapped to the sub-frame by an equation of:

$$x^q(n)=d(q+n \times Q),$$

wherein $x^q(n)$ represents the complex data symbols mapped onto a sub-frame q; $d(q+n \times Q)$ represents a $(q+n \times Q)$-th complex data symbol; $M_{sym}^{SF}$ represents an amount of complex data symbols mapped onto the sub-frame q; q represents a sub-frame index, and q=0, 1, ... Q−1; and n represents an index of the complex data symbol mapped to a sub-frame, and n=0, 1, ... $M_{sym}^{SF}$−1.

7. The user equipment according to claim 6, wherein the modulation module is particularly configured:
for a complex data symbol in a sub-frame, to spread the complex data symbol by a spread code to obtain a sequence of spread data corresponding to the complex data symbol, to map the sequence of spread data onto time-frequency resources and to modulate the sequence of spread data on the time-frequency resources to generate OFDM symbols.

8. The user equipment according to claim 7, wherein the modulation module is particularly configured:
to map the sequence of spread data onto all of a part of the time-frequency resources.

9. The user equipment according to claim 7, wherein the modulation module is particularly configured:
to map a sequence of spread data corresponding to a complex data symbol onto a same sub-carrier of different OFDM symbols through spreading in the time domain; or to map a sequence of spread data corresponding to a complex data symbol onto a plurality of sub-carriers of a same OFDM symbol through spreading in the frequency domain; or to map a sequence of spread data corresponding to a complex data symbol onto a plurality of sub-carriers of a plurality of OFDM symbols through spreading in both the time and frequency domains.

10. A network-side device for uplink transmission, the network-side device comprising:
a reception module configured to de-spread spread signals on Q sub-frames to obtain de-spread data on the respective sub-frames, wherein Q represents a positive integer; and
a second processing module configured to combine the de-spread data on the Q sub-frames and to perform a reception process on the combined data;

wherein the second processing module combines obtained transmission signals by an equation of:

$d(m)=x^q(n)$, wherein $q=\lfloor m/M_{sym}^{SF} \rfloor$, $n=m-q \times M_{sym}^{SF}$; $d(m)$ represents m-th data after combining; $x^q(n)$ represents n-th de-spread data in a sub-frame q; $M_{sym}^{SF}$ represents an amount of de-spread data in the sub-frame q; and q represents a sub-frame index;

or wherein the second processing module combines obtained transmission signals by an equation of:

$d(m)=x^q(n)$, wherein $n=\lfloor m/Q \rfloor$, $q=m-n \times Q$; $d(m)$ represents m-th data after combining; $x^q(n)$ represents n-th de-spread data in a sub-frame q; and q represents a sub-frame index.

* * * * *